US007166061B2

(12) United States Patent
Shimomura et al.

(10) Patent No.: US 7,166,061 B2
(45) Date of Patent: Jan. 23, 2007

(54) CONTROL DEVICE FOR HYDRAULIC WINCH

(75) Inventors: Koichi Shimomura, Akashi (JP); Masaaki Ehara, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 163 days.

(21) Appl. No.: 11/014,832

(22) Filed: Dec. 20, 2004

(65) Prior Publication Data

US 2005/0143219 A1 Jun. 30, 2005

(30) Foreign Application Priority Data

Dec. 26, 2003 (JP) ............................ 2003-435098

(51) Int. Cl.
*B60W 10/08* (2006.01)
*B66D 1/08* (2006.01)

(52) U.S. Cl. ...................... 477/199; 477/184; 477/185; 254/361; 254/377

(58) Field of Classification Search ................ 477/107, 477/183–185, 199; 254/360, 361, 377
See application file for complete search history.

(56) References Cited

U.S. PATENT DOCUMENTS 3,799,302 A * 3/1974 Workman et al. ........... 477/199
3,848,716 A * 11/1974 Hanning ..................... 477/199
5,806,838 A * 9/1998 Kalve et al. ................ 254/361
6,371,447 B1 * 4/2002 Imanishi et al. ............ 254/361
6,648,303 B1 * 11/2003 Nishimoto et al. ......... 254/361

FOREIGN PATENT DOCUMENTS

JP 2001-317442 11/2001
JP 3326116 7/2002

* cited by examiner

*Primary Examiner*—Ha Ho
(74) *Attorney, Agent, or Firm*—Oblon, Spivak, McClelland, Maier & Neustadt, P.C.

(57) ABSTRACT

According to a control device for a hydraulic winch, a regulator controls a motor capacity of a hydraulic motor having variable capacity functioning as a driving source of the hydraulic winch in response to a load pressure, a negative brake stops and retains the hydraulic motor at an automatic shutoff for prevention of overloading, and a controller sends signals to the regulator via a regulator-controlling valve at the automatic shutoff to set the motor capacity at a large value. Thus, the delay to recover the motor capacity at the time of returning from the automatic shutoff that is activated during winding-up of a load does not occur, and a control response is increased.

6 Claims, 7 Drawing Sheets

CONTROL DEVICE FOR HYDRAULIC WINCH

BACKGROUND OF THE INVENTION

1. Field of the Invention

The present invention relates to control devices for hydraulic winches for controlling winding-up/winding-down operations of winch drums by hydraulic motors having variable capacity functioning as power sources.

2. Description of the Related Art

A hydraulic motor having variable capacity is often used as a driving source of a hydraulic winch for varying speed and power of winding-up/winding-down in response to a load. The structure of an exemplary device is shown in FIG. 6.

A negative brake 12 for maintaining a hydraulic motor 1 in a halt state is provided on the hydraulic motor 1. This negative brake 12 is activated when a brake valve 14 shifts from a brake-releasing position x to a brake-activating position y to release the hydraulic pressure in a pressure chamber 12*a* into a tank T.

A switching valve 16 is controlled by a signal from a controller 11. At the time of an automatic shutoff, the switching valve 16 shifts from a readout position y for reading out a remote-control pressure to a shutoff position x for shutting off the remote-control pressure.

A regulator 18 is fundamentally controlled on the basis of two signals including a load pressure applied to the hydraulic motor 1 and the amount of the operation of a remote-control valve 6. The "load pressure" means the absolute value of a difference in pressure between the inlet and the outlet of the motor. The differential pressure herein is determined by subtracting the pressure at the winding-down side pipeline 3 from that at the winding-up side pipeline 2.

Specifically, the regulator 18 transmits the load pressure via load pressure lines 19, and the motor capacity is increased with the increase of the load pressure by the operation of a sequence valve (not shown) or a constant horsepower (CHP) valve (not shown). Accordingly, the increase of the load pressure is regulated (constant-horsepower control).

Secondly, remote-control pressure lines 7*u* and 7*d* are connected to the regulator 18 via a shuttle valve 17 and a readout line 20 for reading out the remote-control pressure. With this arrangement, the motor capacity is decreased as the amount of the operation of the remote-control valve 6 is increased, and thus, the motor speed is increased (motor-speed control).

In addition, when the amount of the operation of the remote-control valve 6 is zero, i.e. in a neutral state, the motor capacity is set to the maximum.

However, the above-described structure has the following problems:

(i) Slow Control Response

For example, during winding-up of a large load, combined control of lowering a boom and winding-up with a winch can cause the load to swing. In this case, since the load fluctuates around a border of an overload level, chattering occurs to repeat the automatic shutoff and releasing the automatic shutoff.

If the remote-control valve 6 is returned to the neutral position at this time, the hydraulic motor 1 is set to a large capacity. On the contrary, if the winding-up operation is continued, the negative brake 12 is activated at the automatic shutoff, and the load pressure is set to zero. As a result, the motor capacity is set at a small value.

Accordingly, when the negative brake 12 is released, a certain time is required for the motor capacity to return to a required value depending on the load pressure at that time.

Therefore, a high load pressure is temporally applied to the small-capacity motor at the time of returning from the automatic shutoff to cause a slow control response.

(ii) Low Motor-Capacity Ratio

FIG. 7 illustrates the relationship between a single line pull of a winch (load pressure) and a single line speed (motor capacity). The curved portion in FIG. 7 shows a control range in a constant horsepower.

For example, a motor-capacity range of the hydraulic motor 1 is defined between a point B (smaller capacity) and a point C (larger capacity) in the medium capacity range (the range between broken lines). When the motor is automatically halted at the larger capacity (point C) during suspending of a load, the negative brake 12 is activated to set the load pressure to zero. Consequently, the motor capacity is reduced to the smaller value (point B) due to the constant horsepower control.

When the automatic shutoff is released while the remote-control valve 6 is operated, the motor is instantaneously subjected to the load at the point C with the capacity at the point B. The load pressure at this time is expressed by $R_{C/B}\times P$, where $R_{C/B}$ is the motor-capacity ratio determined by dividing the motor capacity at the point C by the motor capacity at the point B, and P is a predetermined pressure for constant horsepower control.

For example, when P is set at half of a predetermined pressure of an overload-relief valve 9 (overload pressure) and $R_{C/B}$ is 2 or less, the load pressure is less than the overload pressure. Therefore, the motor capacity increases from the point B to the point C without an activation of an overload-relief operation.

In contrast, when the motor capacity ranges from a point A (minimum capacity) to the point C, for example, the motor-capacity ratio is increased, and thus the load pressure at the time of returning from the automatic shutoff increases to $R_{C/A}\times P$, where $R_{C/A}$ is the motor-capacity ratio determined by dividing the motor capacity at the point C by the motor capacity at the point A. In this case, the load pressure is higher than the overload pressure, and the overload-relief operation is activated. Accordingly, the control response to winding-up is very slow.

This is one of the reasons why the motor-capacity ratio of the hydraulic motor 1 cannot be increased. As a result, the speed control range at the same amount of supplied oil cannot be expanded.

SUMMARY OF THE INVENTION

Accordingly, it is an object of the present invention to provide a control device for a hydraulic winch varying a motor capacity in response to a load pressure, activating a negative brake at an automatic shutoff, and improving a control response at the time of returning from the automatic shutoff.

The control device according to the present invention basically has the following structure:

The control device according to the present invention includes a hydraulic motor having variable capacity functioning as a driving source of the hydraulic winch, motor-capacity controlling means for controlling the capacity of the hydraulic motor in response to a load pressure such that the capacity is large when the load pressure is high, automatic shutoff means for automatically halting the rotation of the hydraulic motor under a predetermined condition, and a brake unit for maintaining the hydraulic motor in a halt state at an automatic shutoff of the hydraulic motor. The motor-capacity controlling means sets the capacity of the hydraulic motor at a large value at the automatic shutoff by the automatic shutoff means.

According to the above-described structure of the present invention, the motor capacity is automatically set and fixed at a large value at the automatic shutoff.

At the automatic shutoff, the motor capacity is set at a large value. Therefore, regardless of the load pressure, the motor can start rotating with a large capacity at the time of returning from the automatic shutoff even with chattering that occurs due to load swinging and the like during winding-up and that repeats the automatic shutoff and releasing the automatic shutoff.

Accordingly, the delay to recover the motor capacity does not occur, and the control response is improved.

In addition, the load pressure does not exceed an overload pressure at the time of releasing the automatic shutoff even with a high motor-capacity ratio since the motor capacity is set at a large value at the automatic shutoff, in contrast to the control device according to the related art having a possibility of a small motor capacity at the automatic shutoff. Therefore, the motor-capacity ratio can be set at a large value, and a speed control range can be expanded. As a result, a large-capacity winch can be produced with a small motor to significantly improve performance of crane tracks.

In the above-described structure, the control device may further include operating means for controlling an activation of the hydraulic motor. The operating means preferably outputs an operation signal as the external command signal, and the motor-capacity controlling means preferably controls the capacity of the hydraulic motor such that the capacity of the hydraulic motor is large when the amount of the operation of the operating means is small.

Moreover, in the above-described structure, the motor-capacity controlling means may include a regulator for varying a tilting angle of the hydraulic motor, and a controller for sending a capacity-controlling signal that controls the capacity of the hydraulic motor to the regulator via a regulator-controlling valve. The capacity-controlling signal from the controller preferably drives the regulator to set the capacity of the hydraulic motor at a large value at the automatic shutoff.

Furthermore, in the above-described structure, the brake unit may be a negative brake that releases the brake when the hydraulic pressure is introduced from a hydraulic power source to a pressure chamber of the negative brake, and an inlet port of the hydraulic power source of the regulator-controlling valve is preferably connected to the pressure chamber of the negative brake.

In addition, in the above-described structure, the motor-capacity controlling means may include a regulator for varying the tilting angle of the hydraulic motor in response to the operation signal from the operating means, and set the capacity of the hydraulic motor at a large value by cutting the operation signal at the automatic shutoff.

DESCRIPTION OF THE PREFERRED EMBODIMENTS

Embodiments of the present invention will now be described with reference to the drawings.

Figure 1:
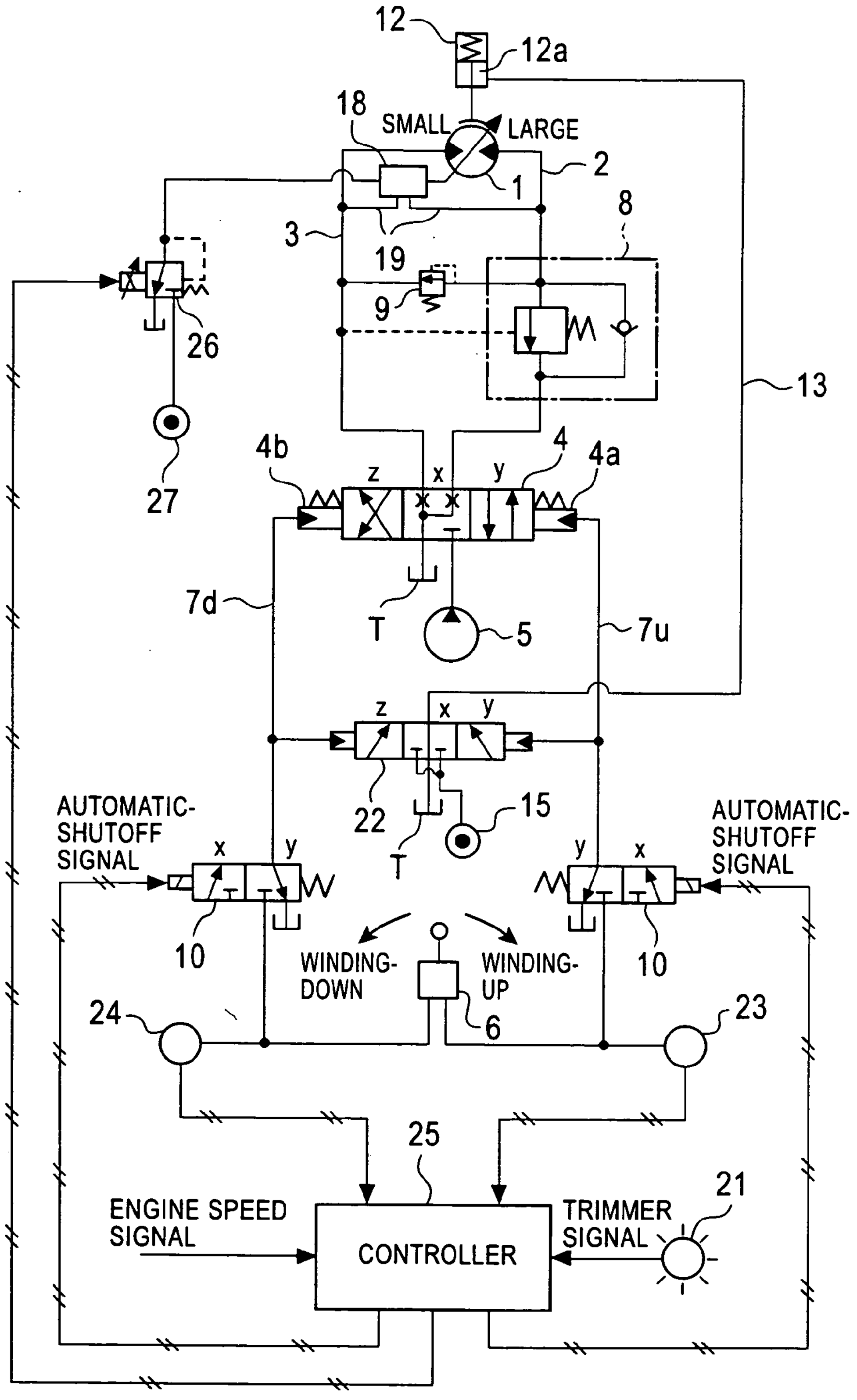
FIG. 1 is a circuit diagram of a control device for a hydraulic winch according to a first embodiment of the present invention.
Figure 2:
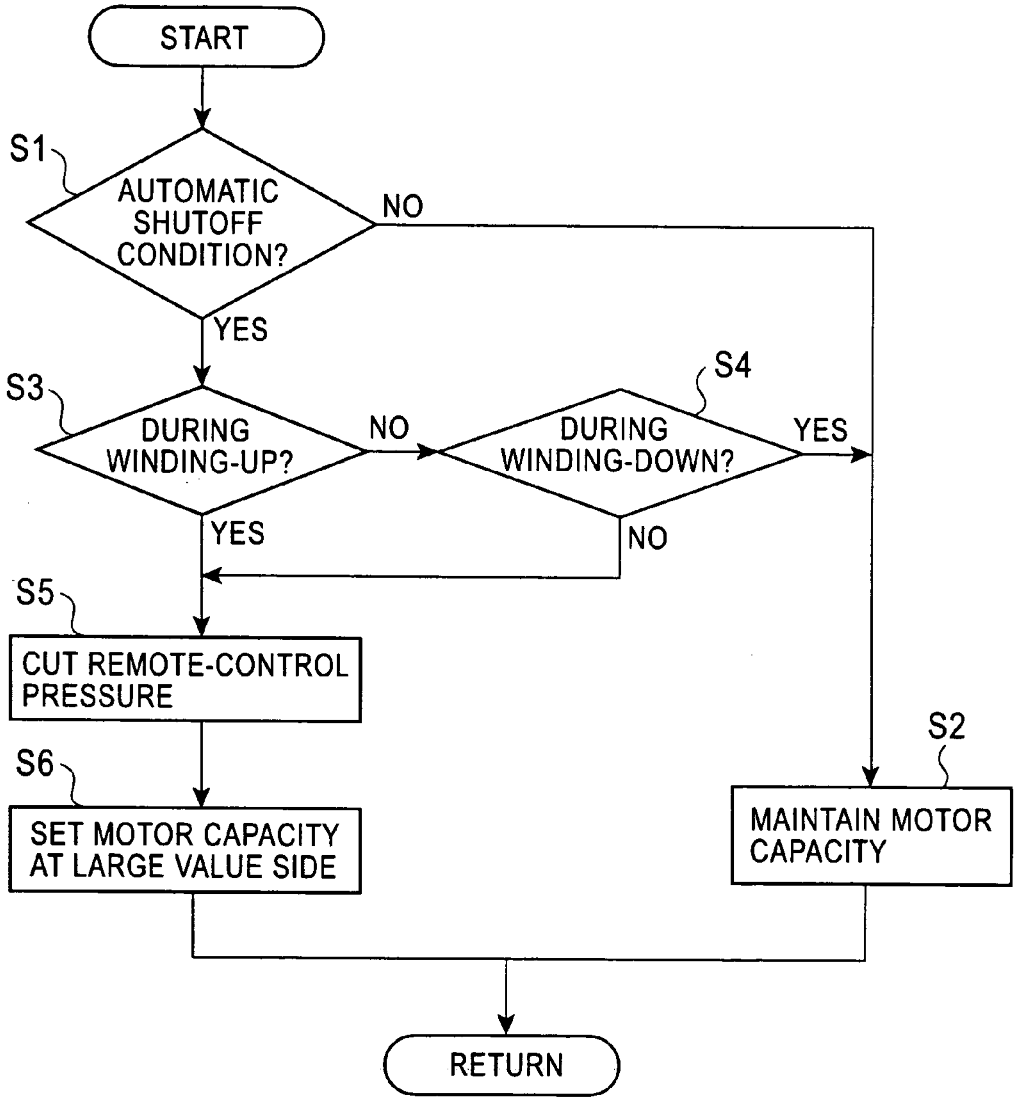
FIG. 2 is a flow chart illustrating the operation of the control device.
Figure 3:
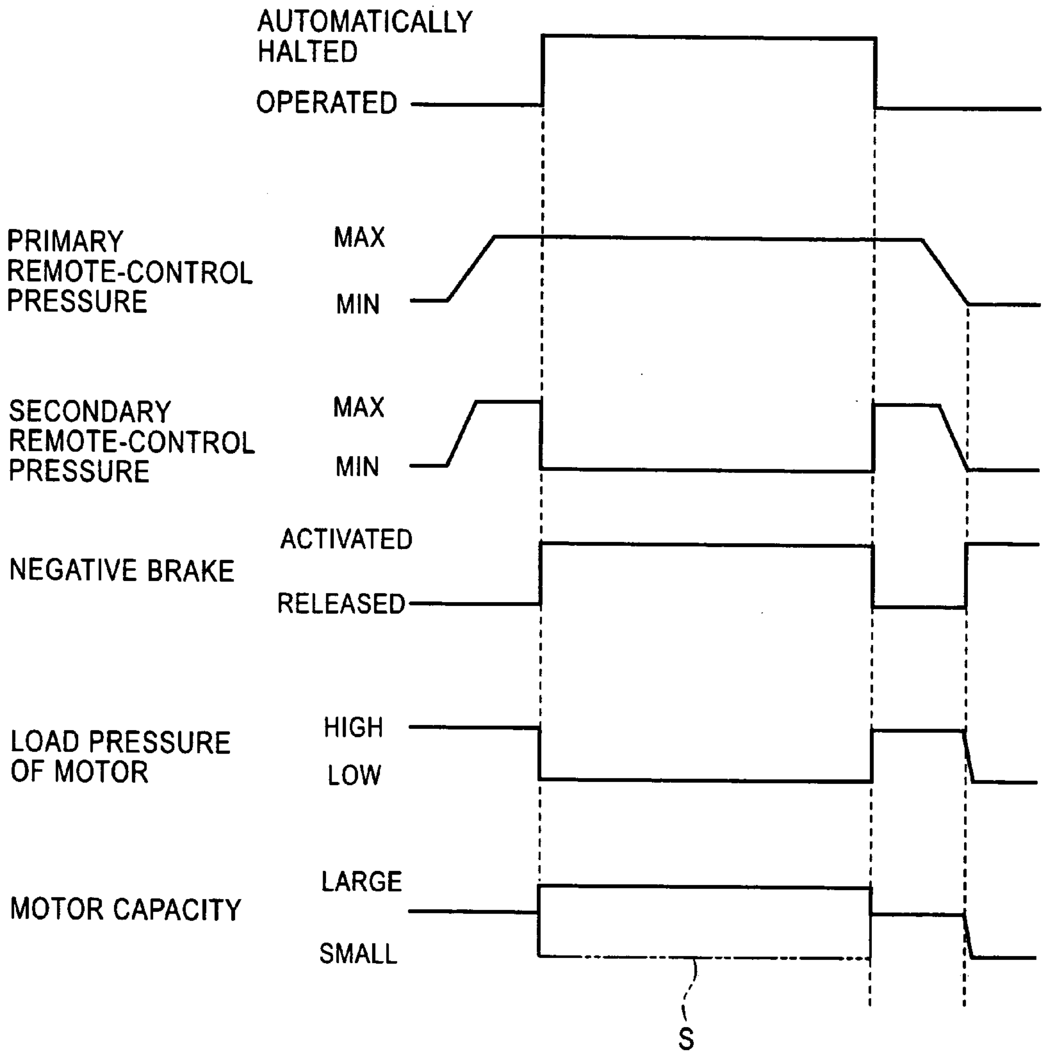
FIG. 3 is a time chart illustrating the same.

First Embodiment (See FIGS. 1 to 3)

In FIG. 1, a hydraulic motor 1 having variable capacity functions as a driving source of a winch. Both a winding-up side pipeline 2 and a winding-down side pipeline 3 of the hydraulic motor 1 are connected to a hydraulic pump 5 via a control valve 4 of a hydraulic pilot switching type having three switching positions x, y, and z for a neutral state, winding-up, and winding-down, respectively. This control valve 4 controls supply and discharge of pressurized oil to the hydraulic motor 1 (driving and halting of the hydraulic motor 1, and the rotating direction and speed at the time of driving).

A remote-control valve 6 functions as operating means for switching the position of the control valve 4 to the winding-up position or the winding-down position. A remote-control pressure generated by the operation of the remote-control valve 6 is transmitted to both a winding-up side pilot port **4*a* of the control valve 4 via a remote-control pressure line 7*u* for winding-up and a winding-down side pilot port 4*b* of the control valve 4 via a remote-control pressure line 7*d*** for winding-down.

A counterbalance valve (a brake valve) 8 is disposed on the winding-up side pipeline 2. This counterbalance valve 8 generates a hydraulic braking force during winding-down of a load to keep the load suspended. Reference numeral 9 denotes an overload-relief valve.

The remote-control pressure lines **7*u* and 7*d* at both sides of the remote-control valve 6 each have an automatic shutoff valve (an electromagnetic switching valve) 10 functioning as automatic shutoff means. If there is a possibility of overloading, including an overwinding of a hook, each of the automatic shutoff valves 10 shifts from a normal position x to a shutoff position y that communicates with a tank T as shown in FIG. 1 in response to automatic-shutoff signals sent from a controller 25** based on a signal from an overload sensor (not shown).

As a result, the control valve 4 returns to the neutral state to automatically stop the winding-up rotation of the hydraulic motor 1.

On the other hand, a negative brake 12 for maintaining the hydraulic motor 1 in a halt state is provided on the hydraulic motor 1. A brake valve 22 of a hydraulic pilot switching type for controlling the negative brake 12 is disposed between the remote-control pressure lines **7*u* and 7*d*. A pressure chamber 12*a* of the negative brake 12 is connected to a hydraulic power source 15 via a brake pressure line 13 and the brake valve 22**.

When the brake valve 22 shifts to a central position x for activating the brake, the pressure chamber **12*a*** of the negative brake 12 is connected to a tank T, and thus the negative brake 12 is activated. When the brake valve 22 shifts to one of the brake-releasing positions y and z in response to the remote-control pressure generated by the operation of the remote-control valve 6, the hydraulic pressure of the hydraulic power source 15 is transmitted to the negative brake 12.

In this manner, activating or releasing the negative brake 12 is drivingly connected to the operation of the remote-control valve 6.

Motor-capacity controlling means for controlling the capacity of the hydraulic motor 1 will now be described.

This motor-capacity controlling means includes a regulator 18 varying the motor capacity by changing a tilting angle of the hydraulic motor 1.

This regulator 18 includes a power piston for driving a swash plate and a servo valve or the like (not shown) controlling the power piston.

The remote-control pressures on the remote-control pressure lines 7*u* and 7*d* are detected by pressure sensors 23 and 24, and input to the controller 25, which is a part of the motor-capacity controlling means.

The controller 25 receives external commands including the remote-control pressure, an engine speed signal, and a signal from a trimmer 21 that sends an external signal. On the basis of these commands, the controller 25 determines a command value, and inputs the value to a regulator-controlling valve 26 as a capacity-controlling signal.

The regulator 18 controls the capacity of the hydraulic motor 1 on the basis of the capacity-controlling signal based on the external commands and a load pressure acquired through load pressure lines 19. Thus, the motor-capacity controlling means controls the motor capacity on the basis of the external command signals in addition to the load pressure on the hydraulic motor 1.

Specifically, the load pressure is transmitted to the regulator 18 via the load pressure lines 19. The motor capacity is increased with the increase of the load pressure by the operation of a sequence valve (not shown) or a constant horsepower (CHP) valve (not shown). Accordingly, the increase of the load pressure is regulated (constant-horsepower control).

On the other hand, for the external commands, the motor capacity is decreased as the remote-control pressure (the amount of the operation of the remote-control valve 6), for example, is increased.

When the external commands and the load pressure compete against each other, the operation for increasing the motor capacity takes priority.

A hydraulic power source 27 supplies a hydraulic pressure to the regulator 18 via the regulator-controlling valve 26.

In this control device, when an automatic shutoff is activated, in other words, when the controller 25 outputs automatic-shutoff signals to the automatic shutoff valves 10 on the basis of a signal from an overload sensor (not shown), the negative brake 12 is activated, and at the same time, a signal for setting a large motor capacity is output from the controller 25 to the regulator-controlling valve 26. On the basis of this signal, the motor capacity of the hydraulic motor 1 is increased to set the motor capacity at a value. "A large motor capacity" herein means a motor capacity sufficient for maintaining the load when the automatic shutoff is released. The large motor capacity is normally the maximum value of the motor capacity or its close value.

In connection with this point, the operation of the controller 25 will now be described with reference to the flow chart in FIG. 2.

First, it is determined whether the automatic shutoff condition is met (step S1). If it is NO, the command value to the motor capacity is maintained at a value determined by the load pressure or the remote-control pressure.

If it is YES in step S1, i.e. overloading may occur, it is then determined whether it is during winding-up (with the possibility of an additional overloading) in step S3. If it is NO, it is determined whether it is during winding-down (or operating to avoid the overloading) in step S4.

If it is YES in step S4, i.e. there is no possibility of overloading, the process proceeds to step S2 to maintain the motor capacity.

On the other hand, if it is YES in step S3 or NO in step S4, i.e. there is a possibility of overloading, the automatic-shutoff signals are output to the automatic shutoff valves 10 to cut the transmission of the remote-control pressure in step S5, and a command signal is sent to the regulator-controlling valve 26 to set and fix the motor capacity at a large value in step S6.

The negative brake 12 is activated at this time.

FIG. 3 illustrates changes in the remote-control pressure, the operation of the negative brake 12, the motor capacity, and the like in response to the operation of the controller 25. The primary remote-control pressure is a line pressure between the remote-control valve 6 and one of the automatic shutoff valves 10 in FIG. 1. The secondary remote-control pressure is a line pressure between one automatic shutoff valve 10 and the winding-up side pilot port 4*a*, i.e. the pressure at the remote-control pressure line 7*u*, or between another automatic shutoff valve 10 and the winding-down side pilot port 4*b*, i.e. the pressure at the remote-control pressure line 7*d* in FIG. 1.

When the automatic shutoff is activated in step S5 in FIG. 2, the transmission of the remote-control pressure (the secondary remote-control pressure in this case) is cut and the negative brake 12 is activated at the same time.

The activation of the negative brake 12 maintains the hydraulic motor 1 in a halt state, and thus, the load pressure becomes zero.

At this time, the motor capacity according to this control device is large, whereas the motor capacity according to the above-described related art is set at a small value as shown in FIG. 3 with a chain double-dashed line S. Accordingly, when the automatic shutoff is released, the hydraulic motor 1 can start rotating at a large motor capacity.

Therefore, in a winding-up operation, the hydraulic motor 1 can reliably rotate to wind the load up in contrast to the hydraulic motor 1 according to the related art having a slow control response at the time of returning from the automatic shutoff.

As described above, the motor capacity is set at a large value at the automatic shutoff. Therefore, even when the motor-capacity ratio of the hydraulic motor 1 is high, the load pressure does not exceed the overload pressure at the time of releasing the automatic shutoff. This results in a high motor-capacity ratio and a wide speed control range.

Figure 4:
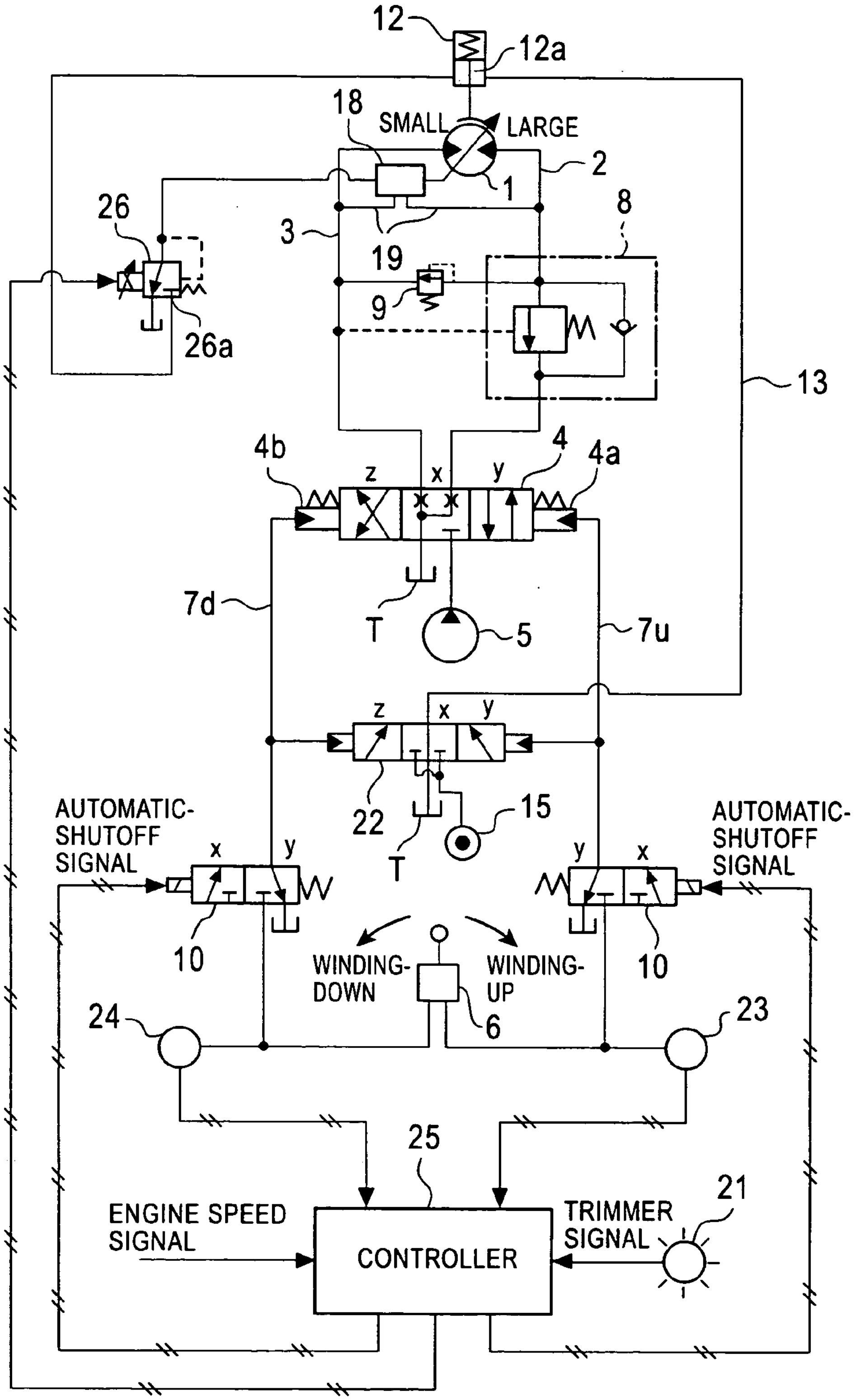
FIG. 4 is a circuit diagram of a control device for a hydraulic winch according to a second embodiment of the present invention.

Second Embodiment (See FIG. 4)

Only differences from the first embodiment will be described.

According to the first embodiment, the hydraulic power source 27 supplies a hydraulic pressure to the regulator 18 via the regulator-controlling valve 26. Accordingly, if the regulator-controlling valve 26 fails when a small-capacity command is issued, as is often the case with electromagnetic valves, the regulator 18 cannot set a large capacity at the automatic shutoff.

Therefore, an inlet port 26*a* of the hydraulic power source of the regulator-controlling valve 26 is connected to the pressure chamber 12*a* of the negative brake 12 in a second embodiment.

With this arrangement, when the negative brake 12 is activated, the hydraulic pressure in the pressure chamber 12*a* and thus the hydraulic pressure in the regulator-controlling valve 26 are released. As a result, even if the regulator-controlling valve 26 fails at a small-capacity command, the regulator-controlling valve 26 sends a driving signal for a large capacity (pressure =0) to the regulator 18, and the hydraulic motor 1 is reliably set at a large capacity at the automatic shutoff.

Figure 5:
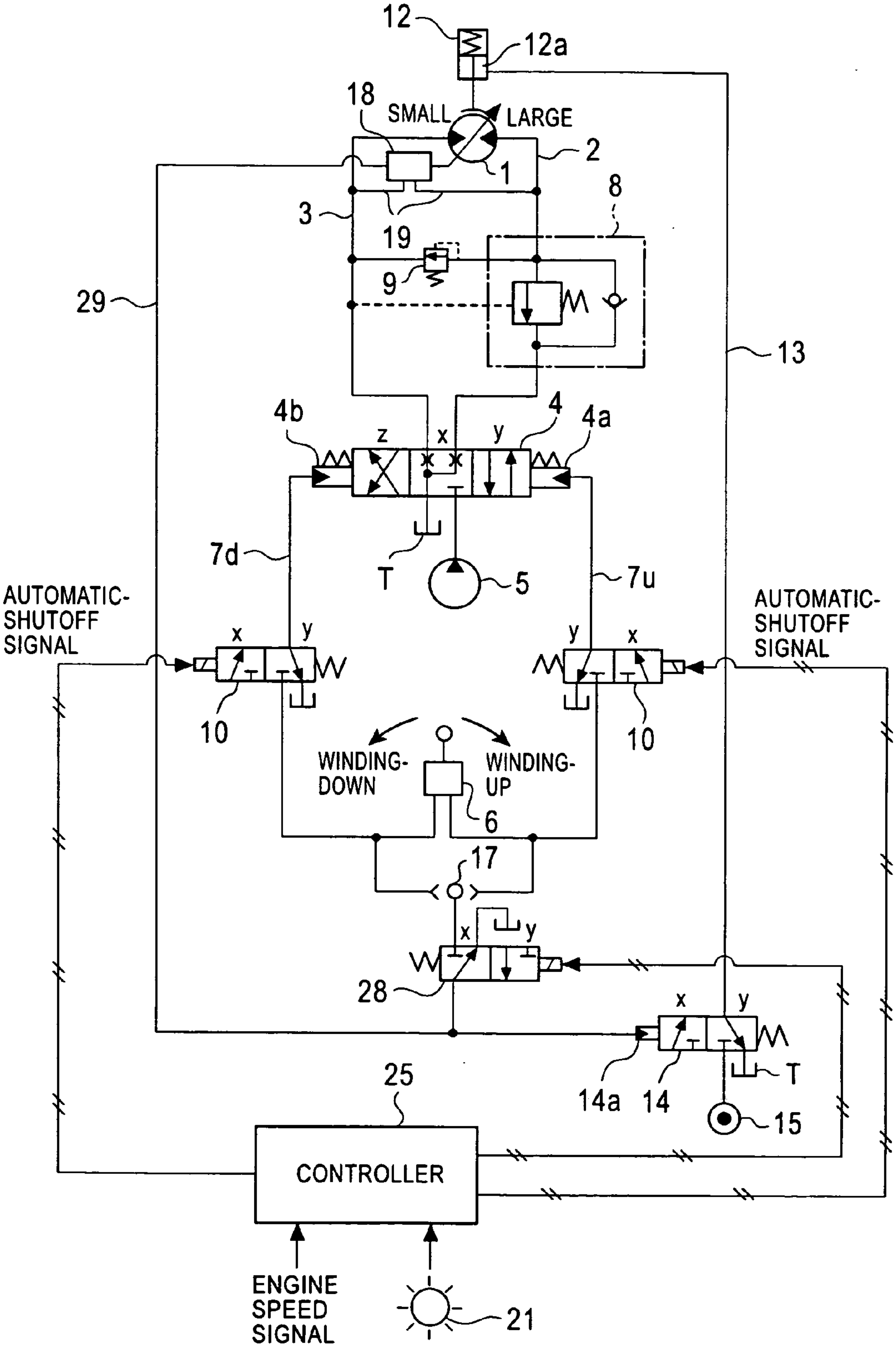
FIG. 5 is a circuit diagram of a control device for a hydraulic winch according to a third embodiment of the present invention.

Third Embodiment (See FIG. 5)

According to the first and second embodiments, the controller 25 outputs a command signal to the regulator-controlling valve 26 to set the hydraulic motor 1 at a large capacity immediately after the activation of the negative brake 12 at the automatic shutoff. In contrast, according to a third embodiment, an operation signal of the remote-control valve 6, i.e. the remote-control pressure, is cut at the automatic shutoff to set the hydraulic motor 1 at a large capacity.

Specifically, the remote-control pressure lines 7*u* and 7*d* are connected to the regulator 18 via a shuttle valve 17, an electromagnetic switching valve 28 controlled by the controller 25, and a readout line 29 for reading out the remote-control pressure. With this arrangement, the motor capacity is decreased as the amount of the operation of the remote-control valve 6 is increased.

The switching valve 28 is normally connected to the shuttle valve 17 and the readout line 29 at a readout position y for reading out the remote-control pressure at the right side of the drawing. When the controller 25 sends the automatic-shutoff signals, the connecting position shifts to a shutoff position x at the left side of the drawing. In this manner, the switching valve 28 functions as capacity-controlling means that supplies or cuts the remote-control pressure of the remote-control valve 6 to the regulator 18.

At the shutoff position x, the readout line 29 communicates with a tank T. Accordingly, the transmission of the remote-control pressure to the regulator 18 is cut, and the amount of the operation of the remote-control valve 6 is set to zero, i.e. a neutral state.

Therefore, the hydraulic motor 1 is automatically set at a large capacity by controlling the tilt of the regulator 18 at the automatic shutoff.

Substantially the same effect as that in the first and second embodiments can be accomplished with the structure of the third embodiment.

Other Embodiments

Figure 6:
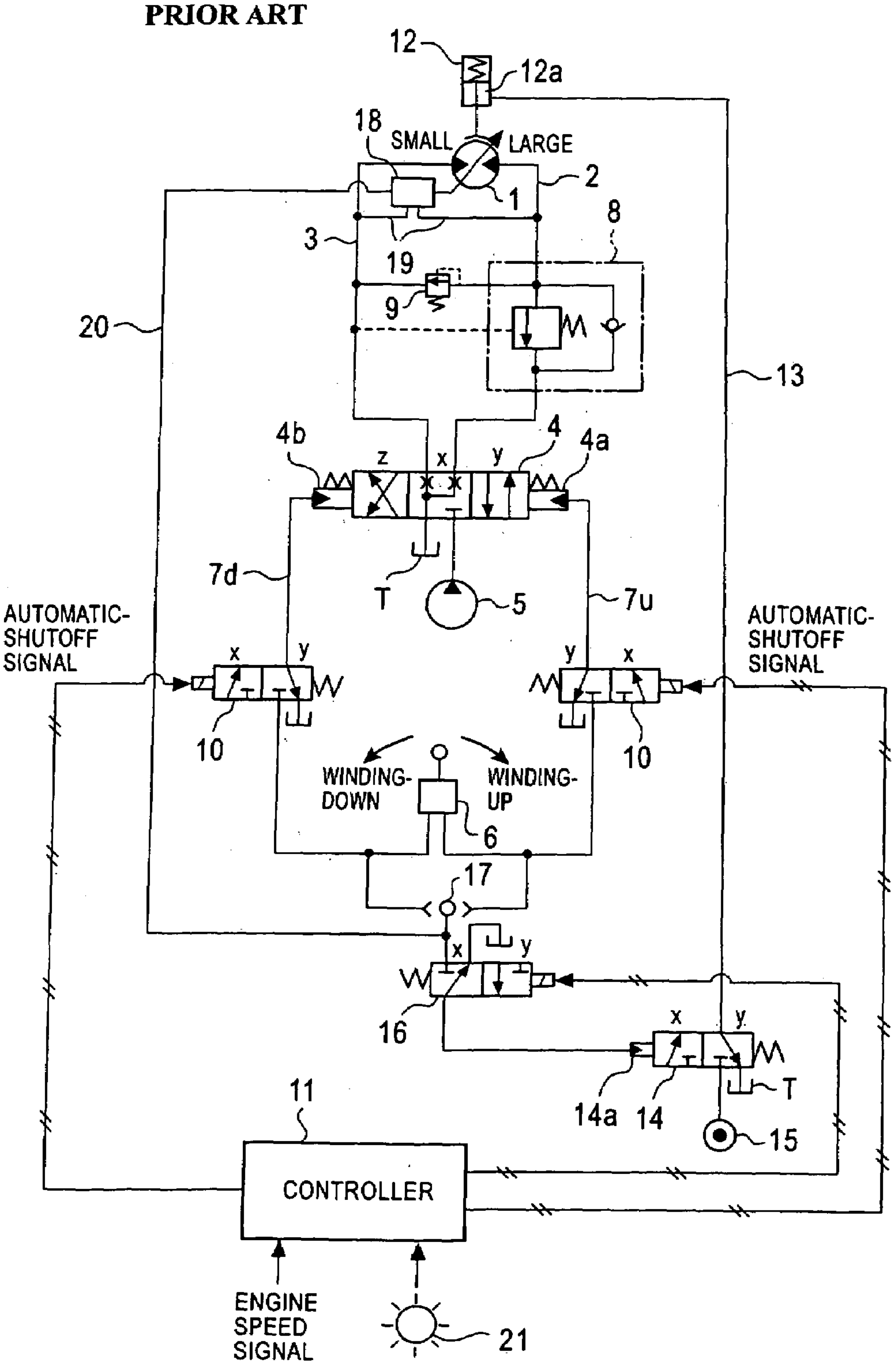
FIG. 6 PRIOR ART
FIG. 6 is a circuit diagram of a control device for a hydraulic winch according to a related art.
Figure 7:
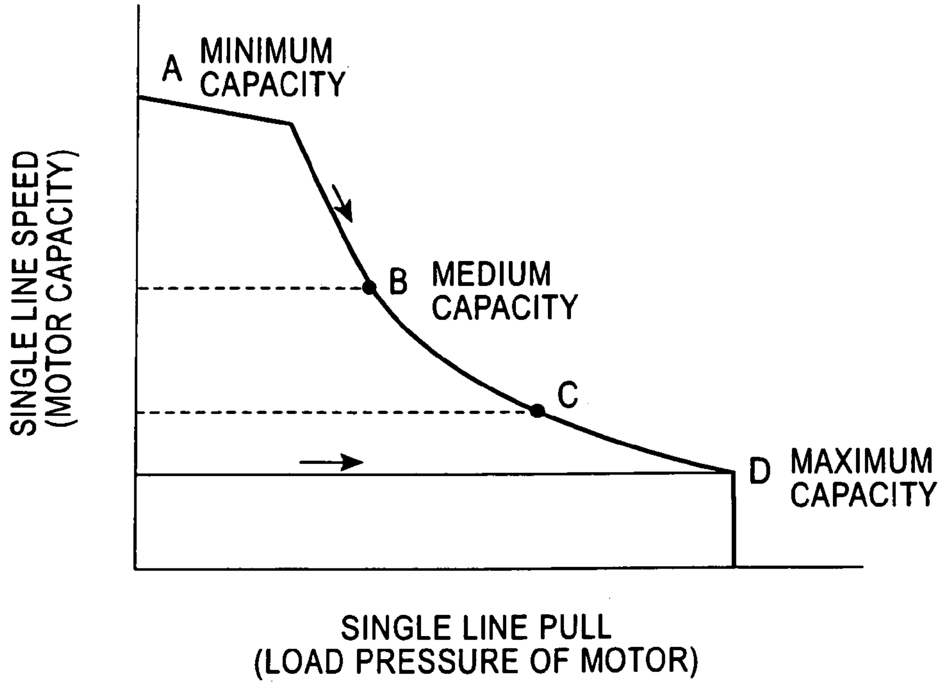
FIG. 7 PRIOR ART
FIG. 7 illustrates the relationship between a single line speed and a single line pull of the control device according to the related art.

1. According to the first and second embodiments, the pressure sensors 23 and 24 each convert the remote-control pressure into an electrical signal, and transmit it to the regulator 18 via the controller 25 and the regulator-controlling valve 26 as an external command for controlling the motor capacity. However, the remote-control pressure may be directly transmitted to the regulator 18 as an external command signal. As is the case with the related art described with reference to FIG. 6, the remote-control pressure generated by the operation of the remote-control valve 6 may be directly sent to the regulator 18 as an external command signal via the line 20.

2. According to the above-described embodiments, the negative brake 12 is used as a brake unit for maintaining the hydraulic motor 1 in the halt state at the automatic shutoff. Alternatively, a positive brake may be used as a brake unit that is activated when a hydraulic pressure is supplied.

Although the invention has been described with reference to the preferred embodiments in the attached figures, it is noted that equivalents may be employed and substitutions made herein without departing from the scope of the invention as recited in the claims.

What is claimed is:

1. A control device for a hydraulic winch comprising:

a hydraulic motor having variable capacity as a driving source of the hydraulic winch;

motor-capacity controlling means for controlling the capacity of the hydraulic motor in response to a load pressure such that the capacity is large when the load pressure is high;

automatic shutoff means for automatically halting the rotation of the hydraulic motor under a predetermined condition; and a brake unit for maintaining the hydraulic motor in a halt state at an automatic shutoff of the hydraulic motor, wherein the motor-capacity controlling means sets the capacity of the hydraulic motor at a large value at the automatic shutoff by the automatic shutoff means.

2. The control device according to claim 1, wherein the motor-capacity controlling means controls the capacity of the hydraulic motor using the load pressure on the hydraulic motor and an external command signal sent from the outside.

3. The control device according to claim 2, further comprising:

operating means for controlling an activation of the hydraulic motor, wherein the operating means outputs an operation signal as the external command signal; and the motor-capacity controlling means controls the capacity of the hydraulic motor such that the capacity of the hydraulic motor is large when the amount of the operation of the operating means is small.

4. The control device according to claim 1, wherein the motor-capacity controlling means comprises a regulator for varying a tilting angle of the hydraulic motor, and a controller for sending a capacity-controlling signal that controls the capacity of the hydraulic motor to the regulator via a regulator-controlling valve, wherein the capacity-controlling signal from the controller drives the regulator to set the capacity of the hydraulic motor at a large value at the automatic shutoff.

5. The control device according to claim 4, wherein the brake unit is a negative brake that releases the brake when the hydraulic pressure is introduced from a hydraulic power source to a pressure chamber of the negative brake; and an inlet port of the hydraulic power source of the regulator-controlling valve is connected to the pressure chamber of the negative brake.

6. The control device according to claim 3, wherein the motor-capacity controlling means comprises a regulator for varying a tilting angle of the hydraulic motor in response to the operation signal from the operating means, and sets the capacity of the hydraulic motor at a large value by cutting the operation signal at the automatic shutoff.

* * * * *